United States Patent [19]
Fletcher et al.

[11] 3,865,975
[45] Feb. 11, 1975

[54] DEEP TRAP, LASER ACTIVATED IMAGE CONVERTING SYSTEM

[76] Inventors: James C. Fletcher, Administrator of the National Aeronautics and Space Administration with respect to an invention of; Joseph Maserjian, 5668 Pine Cone Rd., La Crescenta, Calif. 91214

[22] Filed: Aug. 22, 1973

[21] Appl. No.: 390,468

[52] U.S. Cl. .............. 178/7.1, 250/211 R, 250/578, 315/169 R, 340/173 LS
[51] Int. Cl. .............. H04n 5/30
[58] Field of Search .............. 178/7.1, 7.2, 7.6, 7.7; 250/578, 211 R, 211 J; 315/169 R, 169 TV; 340/173 LS, 173 CC

[56] References Cited

UNITED STATES PATENTS 3,341,825 9/1967 Schreiffer .............. 340/173 LS
3,450,885 6/1969 Willes .............. 178/7.2 X
3,479,455 11/1969 Gebel .............. 178/7.2
3,683,337 8/1972 Holton .............. 340/173 LS

*Primary Examiner*—Robert L. Richardson
*Attorney, Agent, or Firm*—Monte F. Mott; Paul F. McCaul; John R. Manning

[57] ABSTRACT

A system is disclosed for receiving an optical image on the surface of a photoconducting semiconductor, storing the image in deep traps of the semiconductor, and later scanning the semiconductor with a laser beam to empty the deep traps, thereby producing a video signal. The semiconductor is illuminated with photons of energy $h\nu$ greater than the band gap $\Delta E$ producing electron-hole pairs in the semiconductor which subsequently fill traps of a depth $\Delta E_t$ in energy from the band edges. When the laser beam of low energy photons ($\Delta E_T < h\nu' < \Delta E$) excites the trapped electrons and holes out of the traps into the conduction and valence bands, a photoconductivity can be observed.

10 Claims, 3 Drawing Figures

PATENTED FEB 11 1975

3,865,975

DEEP TRAP, LASER ACTIVATED IMAGE CONVERTING SYSTEM

ORIGIN OF INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

This invention relates to a system for converting an optical image into a video signal, and more particularly to a system using a photoconducting semiconductor to store an optical image until the semiconductor is scanned with a laser beam to produce a signal proportional to the intensity of the stored image.

The principal requirements of an image converting system, especially for space exploration, are many. They include high sensitivity, high resolution, wide dynamic (intensity) range, wide spectral range, minimum complexity, low power, small size and weight, integrating and retention times greater than seconds, low lag, and high reliability. For deep space missions there is a special need for storage capability up to hours.

Semiconductors have been studied as to their photoelectric effects, and some efforts have been made to use semiconductors for information storage. An example is a system disclosed in U.S. Pat. No. 3,341,825 titled Quantum Mechanical Information Storage System. There a light beam of a particular wavelength (energy $h\nu$) impinges on the semiconductor to cause the energy level of electrons to be raised from the valence level to a higher storage level. Impurities introduced into the semiconductor material provide a spatial distribution of energy levels within the forbidden gap of the semiconductor material. Electrons in the valence band which absorb energy from the light beam are raised to these levels and stored. A second beam of a different wavelength (energy $h\nu'$) is then used to raise the stored electrons from these levels to the conduction band to determine if any energy has been stored. By scanning with the first beam, and blocking the beam with a digitally controlled shutter, information is stored in binary digital form. Upon scanning with the second beam, the stored information is read out as a train of pulses.

It would be desirable to provide a deep trap storage system in a television camera. However, such a system must be capable of generating a video image signal proportional in amplitude to the intensity of light incident on the semiconductor, where the light is from an image being continually received and stored. The stored image must be capable of being scanned, and as each point of the image is scanned, it must be erased for the storage of a new image. Such a system would be useful in commercial television systems.

SUMMARY OF THE INVENTION

In accordance with the present invention, a film of photoconducting semiconductor material having deep level trapping states is illuminated with an optical image of energy greater than the band gap $\Delta E$ of the semiconductor material. During exposure the incident flux is integrated by the semiconductor material by absorption of photons of energy $h\nu>\Delta E$ to produce pairs of electrons and holes, one or both of which are trapped in the deep level states for a period of time depending upon the environmental temperature and the depth of the traps in energy from the band edges, where the depth is $\Delta E_t$. A focused beam of low energy $h\nu'$ is employed to scan the semiconductor and thereby empty the traps, where $\Delta E_t < h\nu' < \Delta E$. A photocurrent is released during this scanning process due to a constant bias field across the semiconductor in the direction of the photon path. The bias field is established by a constant voltage source across the conductive plates on opposite surfaces of the semiconductor. At least one of the plates must be transparent, and in the case of receiving the optical image on one side and the scanning beam of light on the other side of the semiconductor film, both must be transparent. The photocurrent is detected by suitable means in series with the bias voltage source.

DESCRIPTION OF THE PREFERRED EMBODIMENTS

Figure 1:
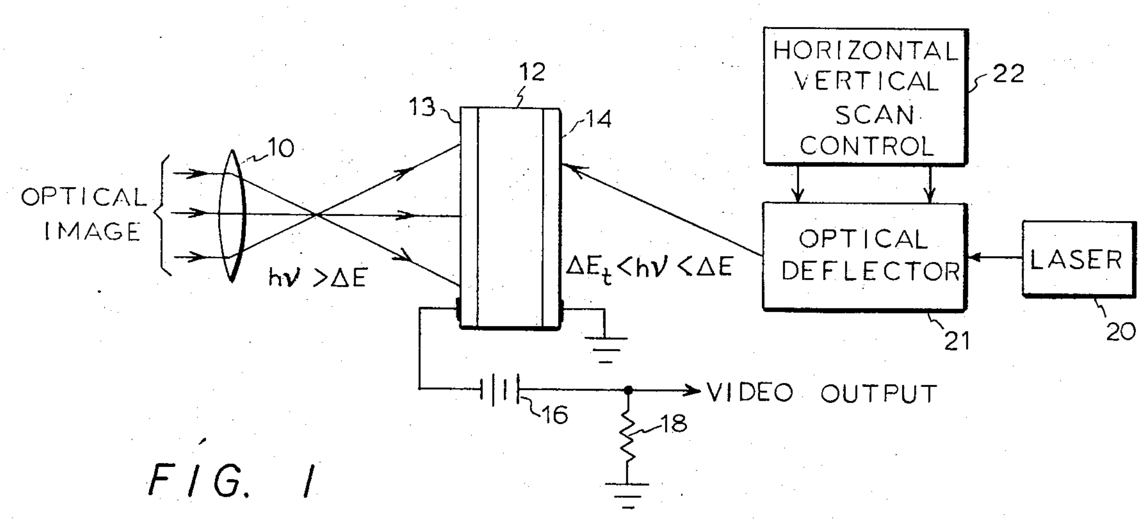
FIG. 1 illustrates schematically a deep trap storage system in accordance with the present invention.

The system of FIG. 1 receives an optical image through a camera focusing lens 10. A photoconducting semiconductor film 12 is placed at the focal plane of the lens. Transparent conducting plates 13 and 14 are connected to a constant voltage source 16 through a resistor 18 and circuit ground as shown. The resistor, which functions as a photocurrent detector through the semiconductor, is small ($\approx$ 50 ohms) in order that the bias voltage across the semiconductor remain substantially constant. A video output signal is taken directly across the resistor.

Figure 2:
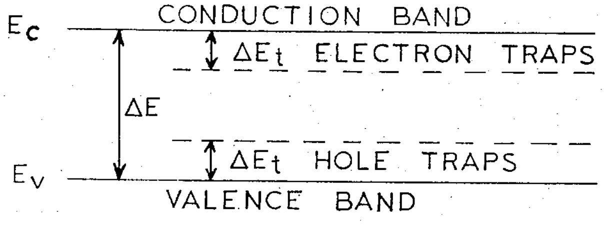
FIG. 2 is an energy level diagram useful in understanding the present invention.

The semiconductor is grown or diffused with a high concentration of deep traps, for example traps for both holes and electrons. When the photoconducting semiconductor is illuminated with the optical image of high intensity of energy $h\nu$ greater then the band gap $\Delta E$ of the photoconducting semiconductor, the empty trap states are filled with electrons and holes. The result is a non-equilibrium condition which persists for relatively long times depending on the temperature and the depth of the traps in energy $\Delta E_t$ from the band edges as indicated in FIG. 2.

This process of filling the trap states results when electron-hole pairs are first generated by fundamental absorption of photons of energy $h\nu > \Delta E$. The electrons and holes are then trapped in the deep states from the respective conduction and valence bands. This trapping process occurs rapidly compared with the exposure time when a high density of traps are present.

The non-equilibrium condition allows the semiconductor to respond to lower energy photons $h\nu'$ of relatively *low* intensity. These lower energy photons can excite trapped electrons and holes into the conduction and valence bands, and a photoconductivity can be observed across the resistor.

This process of detrapping with low intensity light is useful for studying trap properties and the kinetics of trapping, but for the purpose of this invention, the process is modified by using an intense beam (laser) of low energy photons ($\Delta E_t < h\nu' < \Delta E$) which completely depopulates the traps. Emptying of the traps can occur very rapidly (almost instantaneously) with even a very modest intensity laser beam. For example, a 1 mw beam of photons of energy $h\nu = 0.6eV$ focused on a 1 $\mu m$ spot would empty the traps ($\Delta E_t < 0.6eV$) in less than a nanosecond if a typical photon capture cross-section is greater than $10^{-15}$ $cm^2$ is assumed.

The emptied traps may also constitute a non-equilibrium condition (if at thermal equilibrium some traps are occupied), but it does not matter since trapping occurs over a period which is much shorter than the time required to equilibrate, for example over a period of 1/30 second for commercial television scanning with a beam from a laser 20 deflected by a suitable optical deflector 21 in response to horizontal and vertical scan control signals from a generator 22. Once emptied at a given site, the photoconductor is ready to receive and detect very low intensity incoming photons of energy above the fundamental absorption band ($h\nu > \Delta E$). The incident photons of these energies are absorbed in a thin layer of the semiconductor, generating electron-hole pairs as they are absorbed. The electrons and holes are quickly trapped in the trapping states which are assumed to be present in high concentrations for this hypothetical example.

This process of trapping continues during the period of exposure (from 1/30 second to a few seconds, depending upon the application) so that the accumulated trapped carries (electrons and holes) have integrated the incident flux of photons. This accumulation of trapped carries (holes and electrons) can be read-out by emptying the traps through another exposure to the laser beam of low photon energy ($\Delta E_t < h\nu' < \Delta E$). The photocurrent released during the laser exposure is due to a constant bias voltage across the photoconductor. The bias voltage may be between a few volts and some higher level where dark current becomes too high. The optimum for a given system intended to be used in a particular environment can be determined empirically.

From the foregoing, it is demonstrated how this trapping and detrapping process can be operated so as to provide an "image tube," namely by focusing the image on the surface of the photoconductor (as in conventional vidicons) and scanning the image (stored by trapped carriers) with the laser beam. This scanning process continually prepares the photoconductor for the next image exposure by virtue of the fact that all traps have been emptied. The laser beam thus replaces the electron beam in conventional vidicons in which a charge-density pattern is formed by photoconduction and stored on that surface of the photoconductor which is scanned by an electron beam, usually of low-velocity electrons. The current which results from carriers released from traps at each point of the scan may be synchronously detected through a conventional amplifier circuit, and either stored on a magnetic tape or transmitted on a carrier signal.

The laser scanning operation can be accomplished with great accuracy by advanced techniques, such as the use of an acousto-optic X-Y deflection system model LD400T of Isomet Corporation. It employs two piezoelectric crystals, such as barium titanate, to set up acoustic waves in deflector crystals. Each crystal constitutes an acousto-optic deflector which utilizes the photo-elastic interaction of the crystal to deflect light from a laser beam. When the incident light beam is inclined at the Bragg angle relative to the acoustic wavefront through the crystal, high deflection efficiencies over a wide bandwidth are attainable.

Acoustic waves propagating from a flat thickness mode piezoelectric crystal into a deflecting crystal form almost planar wave fronts traveling in the crystal. Light rays passing through the crystal approximately parallel to the acoustic wave fronts are diffracted by the phase grating formed by the acoustic waves. If the light strikes the acoustic wave fronts at the proper angle, the light appears to be reflected from these fronts.

In the case of deflectors made of anisotropic crystals, such as $TeO_2$, the polarization of the incident laser beam becomes an important consideration. The Model 400T system, for example, requires a vertically polarized input beam for optimum performance. The vertically polarized incident light is converted to right hand circularly polarized light by a ¼ wave plate. The light is then diffracted by the horizontal deflector which also effects a 180° retardation. The resulting left hand circularly polarized light is then converted back to right hand by a ½ wave plate. Finally, the beam is deflected by the Y deflector yielding left hand polarized light at the output.

The use of tellurium dioxide as the deflecting medium in an acousto-optic light deflector has been described by A. W. Warner, et al., in "Acousto-Optic Light Deflectors Using Optical Activity in Paratellurite," J. Appl. Phys., Vol. 43, No. 11, Nov. 1972, and the principles involved have been discussed by R. W. Dixon in "Acoustic Diffraction of Light in Anisotropic Media," IEEE Journal of Quantum Electronics, Vol. QE-3, No. 2, Feb. 1967. Other materials for both the deflecting medium and the driving piezoelectric crystal may be suitable. Consequently, the present invention is not limited to the Model 400T of Isomet. In fact, an electromechanical deflector using two prisms rotating about horizontal and vertical axis may be employed where the intended environment permits, or the combination of an acousto-optic deflector in the fast horizontal direction and either a rotating refractive prism or a galvanometer in the slow vertical direction may be used as described by I. Gorog, et al., in a paper titled "Television-Rate Laser Scanning," RCA Review, Vol. 33, December, 1972.

Operation of the system just described is analogous to conventional vidicons in that it integrates the incident photons of an image in the form of an electrical charge and then senses the integrated charge. Consequently, shades of gray can be recorded for reproduction as with a conventional vidicon. In a vidicon the charge is normally stored on the opposite surface of the photoconductor and the charge is then read off at each point by a scanning electron beam. In the present system the image is integrated in the form of trapped charge carriers which are sensed through an electrical circuit when released by the scanning laser beam.

The advantages of this system satisfy some very important requirements for image sensors. The elimination of high energy electron optics avoids some serious reliability and failure problems such as limited cathode life and degradation of photosensitive material (particularly silicon in silicon vidicons) due to X ray generation. The rapid development of reliable lasers and scanning systems make the scheme described an attractive alternative approach. Very high resolution approaching fundamental optical limits should be achievable since no discrete structures (such as diode arrays) are needed and little lateral spread is anticipated. Sensitivity should be equivalent to the most sensitive vidicons (photon noise-limited) because of the same absorption mechanisms leading to high quantum efficiency and the same kind of integrating feature.

There is a very wide choice of photoconducting semiconductors because of the very minimal requirements on band gap and presence of deep traps. The preferred band gap is in the neighborhood of 1 to 2.5 eV. The upper limit is set by practical optical cut-off wavelengths ($\lambda_c = 1.24/\Delta E$ $\mu$m), the lower limit is set by excessive dark currents due to thermal generation (unless cooled). Deep traps are easily introduced into semiconductors and more often are naturally grown-in (especially in the compound semiconductors). These requirements allow one to consider optimum choices of materials for specific needs; for example, greater spectral range (smaller $\Delta E$), greater stability and predictability (such as gold doped silicon, or long storage times (larger $\Delta E$ and $\Delta E_t$) without cooling. The potential for long storage times (hours) without cooling by using suitable materials is an extremely important advantage in some applications such as deep space.

In addition to the above advantages, the same advantages are offered as for silicon vidicons without the problems of electron optics. These include: no lag (no retention of previous image) and extremely wide dynamic range. An additional advantage would emerge if new advanced techniques for digital-recording using scanning laser beams become available. In this case the image sensor could share the use of the laser and scanning system.

Figure 3:
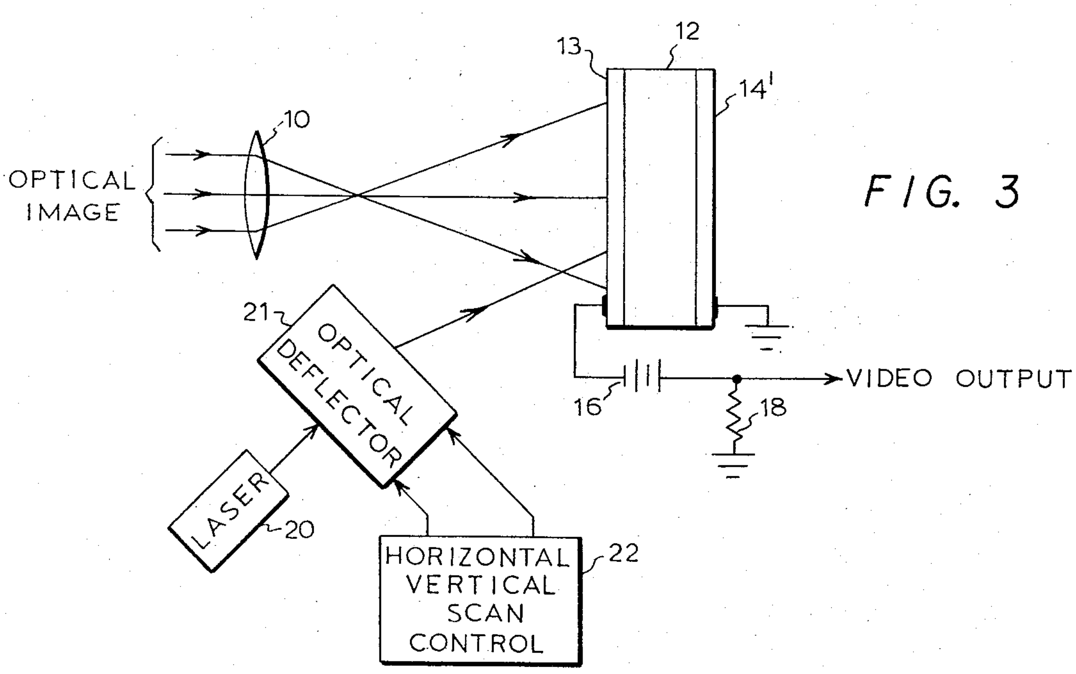
FIG. 3 illustrates schematically a varient of the system of FIG. 1.

Referring now to FIG. 3, a second arrangement is disclosed wherein the same reference numerals are employed for the same elements as in the arrangement of FIG. 1. The only difference is that the incident laser beam is on the same side as the optical image. Consequently, the conducting plate 14' is not required to be transparent.

Three typical examples of the photoconducting films are as follows. The first is silicon diffused with silver at 1300°C and quenched to obtained trap concentrations greater than $10^{17}/cm^3$. Such a high concentration will provide good dynamic range of the system. Selecting silicon as the semiconductor material will yield a system sensitivity equivalent to conventional vidicons using silicon as a photoconductive layer deposited on a signal plate. The band gap $\Delta E$ of the silicon is 1.12 eV, and the depth $\Delta E_t$ of the traps from the band edges is 0.33 eV for electrons and 0.34 eV for the holes of electron-hole pairs produced by photons of the incident image. To read out the stored image, a helium-neon laser could be used at the most efficient 3.39 $\mu$ line to provide photon energy of 0.37 eV which is just enough to empty both hole and electron traps. The second example is gallium-arsenide ($\Delta E$ = 1.43 eV) diffused with chromium for hole traps of depth $\Delta E_t$ of 0.70 eV and oxygen for electron traps of depth $\Delta E_t$ of 0.80 eV. Using the same laser at a strong 1.15 $\mu$ line to provide 1.08 eV photon energy empties both hole and electron traps. This example accommodates a wide portion of the usable spectrum (all of the visible light spectrum) and offers the advantage of deeper traps for longer storage times. However, where the higher sensitivity of silicon is desired with long storage time (e.g., 1 hour), the semiconductor may be cooled. The third example is cadmium-sulfide ($\Delta E$ = 2.4 eV) with cadmium vacancies ($V_{cd}$) as hole traps ($\Delta E_t$ = 1.0 eV). An advantage of this example is that it may be used with a more compact gallium-arsenide injection laser at the 0.88 $\mu$ line of 1.4 eV photons. A disadvantage is that the semiconductor material will cut out part of the visible spectrum of the image, namely wavelengths greater than 5000A. However, even such a restricted spectrum would be useful in space explorations. Compensation may be desirable in this, and the second example, to avoid space charge build-up, using shallow traps (e.g., Si, Cu, etc. in Cd S). The third example illustrates that the system can operate with traps for only one part of the electron-hole pairs produced by photons of the incident image.

For each example, the semiconductor device intended for use in the two-sided configuration is prepared by polishing one surface of a semiconductor wafer and depositing a transparent conductive plate of, for example, tin oxide. That surface is then bonded to a transparent substrate, such as saphire crystal, using transparent material, such as a resin or epoxy. The substrate may extend beyond the width and/or length of the semiconductor to provide a space for a contact pad which is connected to a metalized conductor so deposited on the substrate as to extend under the semiconductor for contact with a contact pad deposited on the transparent conductive plate. The semiconductor wafer is then polished down to a desired thickness of less than 1 mil (10 to 25 microns). A transparent conductive plate is then deposited on the exposed and polished surface and a contact pad is deposited on the outside conductive plate. A transparent sheet may be placed over the outside conductive plate for protection since it is an extremely thin plate.

For use in the one sided configuration, the procedure for preparing the semiconductor device is essentially the same except that the first conductive plate deposited and the substrate need not be transparent. In other words, the back of the semiconductor may be deposited with silver and attached to any suitable support, such as molybdenum or tungsten which, like saphire, have a coefficient of expansion which matches the semiconductor material. Because of this easier procedure for preparing the back of the device, the one sided configuration is preferred.

Although a limited number of specific examples have been given, it is to be understood that the present invention is not so limited. Other combinations of semiconductor material and traps will occur to those skilled in the art, particularly as laser techniques are improved to provide a greater selection of low energy $h\nu'$ for readout, where $\Delta E_t < h\nu' < \Delta E$. Consequently, it is intended that the claims be interpreted to cover such other combinations.

What is claimed is:

1. A system for converting an optical image to an electrical video signal comprising a film of semiconductor material having deep level traps, said semiconductor material having a band gap between its conduction band and its valence band of energy $\Delta E$, where said traps are of predetermined energy depth $\Delta E_t$ for electrons or holes, or electrons and holes, where $\Delta E_t$ is the larger of said predetermined values for electron and hole traps when both are present, a conductive plate on each side of said film, at least one of said plates being transparent, means for focusing said optical image on said film through a transparent one of said plates, said image having photons of energy $h\nu$ greater than said energy $\Delta E$ for producing electron-hole pairs in said semiconductor material for electrons, or holes, or both electrons and holes to be trapped by said deep level trap states, means for producing a high intensity beam of energy $h\nu'$, where $\Delta E_t < h\nu' < \Delta E$, means for deflecting said beam across said semiconductor film through one of said plates, thereby exciting any electrons and holes in said trap states into conduction and valence bands of said semiconductor material, and means connected to said conductive plates for detecting photocurrent produced by any electrons and holes excited into said conduction and valence bands.

2. A system as defined in claim 1 wherein said material is selected to have both types of electron and hole trapping states.

3. A system as defined in claim 1 wherein said material is selected to have only one type of said electron and hole trapping states.

4. A system as defined in claim 1 wherein both of said conductive plates are transparent, and said semiconductor film is scanned with said beam through one of said transparent plates on a side opposite the side on which said optical image is received.

5. A system as defined in claim 1 wherein only one of said conductive plates is transparent, and said semiconductor film is scanned with said beam through said one of said conductive plates on the same side on which said optical image is received.

6. A system as defined in claim 1 wherein said means for producing said beam is a laser.

7. A system as defined in claim 6 wherein said material is selected to have both types of electron and hole trapping states.

8. A system as defined in claim 6 wherein said material is selected to have only one type of said electron and hole trapping states.

9. A system as defined in claim 6 wherein both of said conductive plates are transparent, and said semiconductor film is scanned with said beam through one of said transparent plates on a side opposite the side on which said optical image is received.

10. A system as defined in claim 7 wherein only one of said conductive plates is transparent, and said semiconductor film is scanned with said beam through said one of said conductive plates on the same side on which said optical image is received.

* * * * *